United States Patent
Tian et al.

(10) Patent No.: US 8,868,747 B2
(45) Date of Patent: Oct. 21, 2014

(54) P2P SYSTEM AND A RESOURCE QUERY METHOD FOR THE SAME

(75) Inventors: Hongliang Tian, Shenzhen (CN); Xin Zhang, Shenzhen (CN); Zhenjiang Dong, Shenzhen (CN); Sui Xiao, Shenzhen (CN); Jie Hu, Shenzhen (CN); Zheng Huang, Shenzhen (CN); Ling Hong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 469 days.

(21) Appl. No.: 12/697,386

(22) Filed: Feb. 1, 2010

(65) Prior Publication Data
US 2010/0191855 A1 Jul. 29, 2010

Related U.S. Application Data

(63) Continuation of application No. PCT/CN2007/003561, filed on Dec. 12, 2007.

(30) Foreign Application Priority Data

Jul. 30, 2007 (CN) .......................... 2007 1 0135808

(51) Int. Cl.
*G06F 15/173* (2006.01)
*H04L 29/08* (2006.01)

(52) U.S. Cl.
CPC .......... *H04L 67/104* (2013.01); *H04L 67/1063* (2013.01); *H04L 67/1093* (2013.01)
USPC ....................................................... 709/226

(58) Field of Classification Search
CPC . H04L 67/104; H04L 65/1069; H04L 63/061; H04L 12/24; H04L 12/2856
USPC .......................................................... 709/226
See application file for complete search history.

(56) References Cited

U.S. PATENT DOCUMENTS

| | | | |
|---|---|---|---|
| 7,130,921 B2 | 10/2006 | Goodman et al. | 709/244 |
| 7,272,636 B2 * | 9/2007 | Pabla | 709/216 |
| 7,653,689 B1 * | 1/2010 | Champagne et al. | 709/206 |
| 2004/0103193 A1 * | 5/2004 | Pandya et al. | 709/224 |
| 2005/0021758 A1 * | 1/2005 | White | 709/226 |
| 2008/0034108 A1 * | 2/2008 | Chapweske | 709/234 |

FOREIGN PATENT DOCUMENTS

CN  1863090 A  11/2006  ............. H04L 12/24

OTHER PUBLICATIONS

Melvin Koh; Jie Song; Liang Peng; See, S., "Service Registry Discovery using GridSearch P2P Framework," Cluster Computing and the Grid, 2006. CCGRID 06. Sixth IEEE International Symposium on , vol. 2, No., pp. 11,11, May 16-19, 2006.*

(Continued)

*Primary Examiner* — Taylor Elfervig

(57) ABSTRACT

The present invention discloses a P2P system and a resource query method for this system, wherein the P2P system includes: at least one content management servers, for managing the distribution of content resources in its domain and accepting a resource query request from P2P node in its domain; and at least one resource management servers, for managing the content resources of the P2P nodes in its domain, accepting a resource query request from P2P nodes in its domain and in domains of other resource management servers, and reporting to the at least one content management servers the statistic information of the content resources in its domain.

8 Claims, 3 Drawing Sheets

(56) References Cited

OTHER PUBLICATIONS

Figure 1:
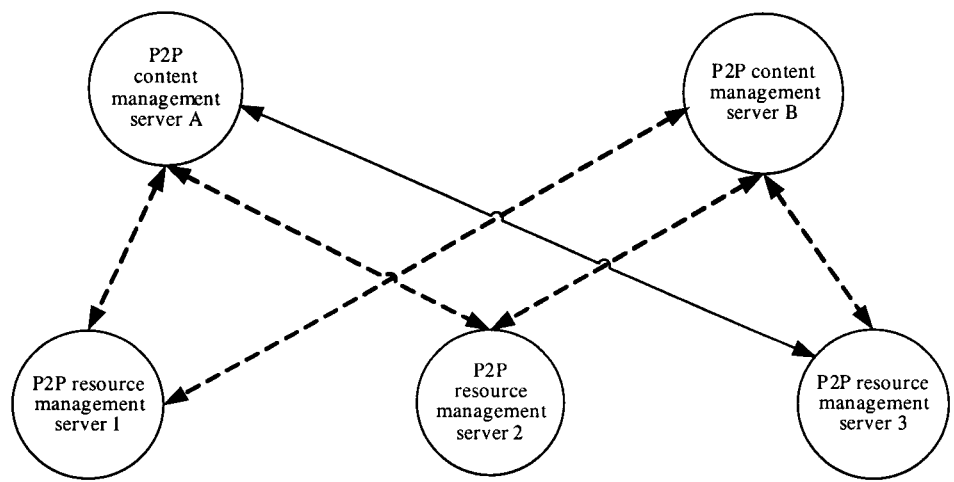

Hye-young Paik; Benatallah, B.; Toumani, F., "Toward self-organizing service communities," Systems, Man and Cybernetics, Part A: Systems and Humans, IEEE Transactions on , vol. 35, No. 3, pp. 408,419, May 2005.*

Nakano, H.; Harumoto, K.; Nishio, S., "Topology Re-formation Algorithms for Ubiquitous P2P Networks Based on Response Statistics," Applications and the Internet Workshops, 2007. SAINT Workshops 2007. International Symposium on , vol., No., pp. 55,55, Jan. 2007.*

So, J.C.H.; Wong, P.C., "Service Commitment and Load Balancing for Domain-based P2P networks," Networking and Services, 2007. ICNS. Third International Conference on , vol., No., pp. 61,61, Jun. 19-25, 2007.*

* cited by examiner

P2P SYSTEM AND A RESOURCE QUERY METHOD FOR THE SAME

This is a continuation of International Application PCT/CN2007/003561, with an International Filing date of Dec. 12, 2007, which claims priority to Chinese Application No. 200710135808.0, filed Jul. 30, 2007, each of which is incorporated by reference.

FIELD OF THE INVENTION

The present invention relates to the field of communication, more specifically to a P2P system and a resource query method for the system.

BACKGROUND OF THE INVENTION

P2P (short for Peer to Peer) technology belongs to a peer-to-peer interne technology. In the P2P network, individual nodes therein have P2P status. Each node, used as both a server and a client, provides services to other nodes when using the services provided by the other nodes.

During the development of P2P, three basic P2P architectures have been formed: the centralized architecture of the first generation P2P network, the distributed architecture of the second generation P2P network, and the hybrid architecture of the third generation P2P network, wherein the first generation centralized architecture has high processing efficiency but unsatisfactory expandability; the second generation architecture has fine expandability and flexible networking but low processing efficiency; and the third generation hybrid architecture in which the advantages of the high processing efficiency of the centralized architecture and the flexible networking of the distributed architecture are combined, is currently a mainstream P2P networking mode.

In the P2P network of the centralized and hybrid architectures, the processing ability of the P2P server is a key factor regarding that the overall properties of the system are fine or bad, and therefore is looked as the bottleneck. Generally, no matter traditional C/S networks or P2P networks, conventional methods for improving the processing ability of the system are provided as follows:

Method 1, servers clustering: clustering multiple servers to improve the processing ability of a single service node; and Method 2, subdividing a service area: by dividing, a reasonable service area is provided for each server/server cluster, and the servers/server clusters of multiple service areas are interconnected and cooperate with each other in a certain manner, to improve the processing ability of the overall network.

During actual use, one or two methods among others are generally adopted to improve the processing ability of the systems. However, method 1 has the disadvantages of high cost and complex solution, and method 2 has the disadvantages of complex synchronization mechanism between the servers/server clusters and low efficiency. Also, what is more important is all types of P2P networks require enough users to provide ample effective resources; and the simple subdividing of service areas will lead to the contradiction of insufficient users in the areas.

SUMMARY OF THE INVENTION

In view of one or more of the above problems, the present invention provides a new P2P system and a resource query method for this system.

Meanwhile, the P2P system according to the embodiment of the present invention comprises: at least one content management server for managing the distribution of the content resources in its domain and accepting a resource query request from the P2P node in its domain; and at least one resource management server for managing the content resources of the P2P nodes in its domain, accepting a resource query request from the P2P nodes in its domain and in domains of other resource management servers, and reporting to the at least one content management server the statistic information of the content resources in its domain.

Meanwhile, the at least one resource management server serves one or more of the at least one content management servers. The at least one resource management servers are independent of each other, and the at least one content management servers are independent of each other. Each of the at least one resource management servers corresponds to one service domain, and each service domain includes plural P2P nodes.

Meanwhile, plural service domains constitute a management domain, and the plural resource management servers corresponding to the plural service domains in a same management domain have identical management domain identifier. The P2P node acquires during registration the information of the resource management server corresponding to the service domain that the P2P node belongs to, and acquires during logging the information of the resource management server corresponding to other service domains which are located in the same management domain as the service domain that the P2P node belongs to.

The resource query method for a P2P system according to the embodiment of the present invention comprises the following steps: S302, a P2P node initiates a resource query request to the resource management server of the service domain that the P2P node belongs to; S304, if the P2P node judges, according to the information returned by the resource management server of the service domain that the P2P node belongs to, that there is no effective resource in the service domain that the P2P node belongs to or the effective resource is not enough, the P2P node initiates a resource query request to the resource management servers of other service domains (otherwise the resource query process is ended); S306, if the P2P node judges, according to the information returned by the resource management servers of said other service domains, that there is no effective resource or the effective resource is not enough in said other service domains, the P2P node initiates a resource query request to one or more content management servers served by the resource management server of the service domain that the P2P node belongs to (otherwise the resource query process is ended); S308, in response to the request of the P2P node, said one or more content management servers return a list of the resource management servers having effective resource; and S310, the P2P node initiates a resource query request to one or more resource management servers in the list of resource management servers.

Meanwhile, the information returned by the resource management servers of the service domain that the P2P node belongs to is a list of candidate source nodes having effective resources in the service domain that the P2P node belongs to. The information returned by the resource management servers of other service domains is a list of candidate source nodes having effective resources in said other service domains. Also, in Step S304, the P2P node sequentially or simultaneously initiates a resource query request to the resource management servers of other service domains.

The present invention can effectively avoid the disadvantages of the traditional resource query methods, greatly improves the processing ability of a P2P system, and can ensure the satisfactory expandability of a P2P system.

BRIEF DESCRIPTION OF THE ACCOMPANYING DRAWINGS

Figure 2:
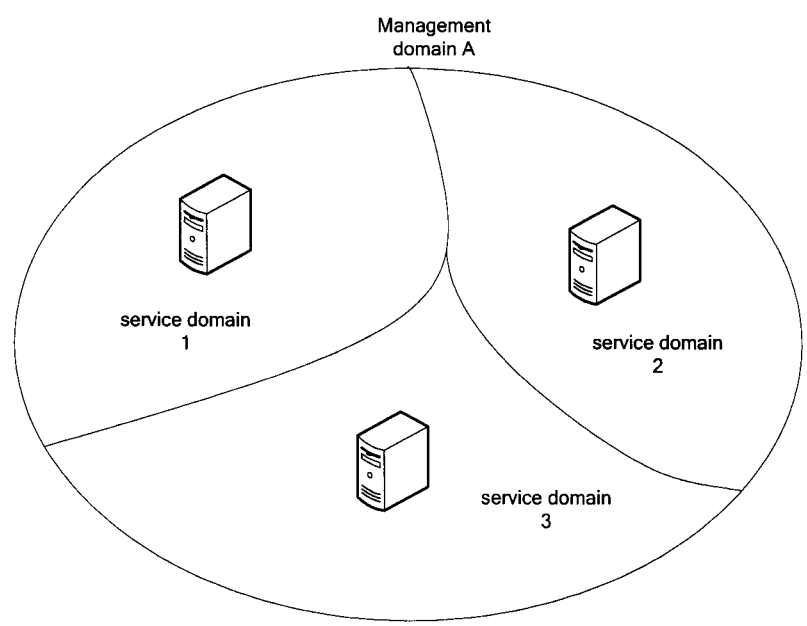
Figure 3:
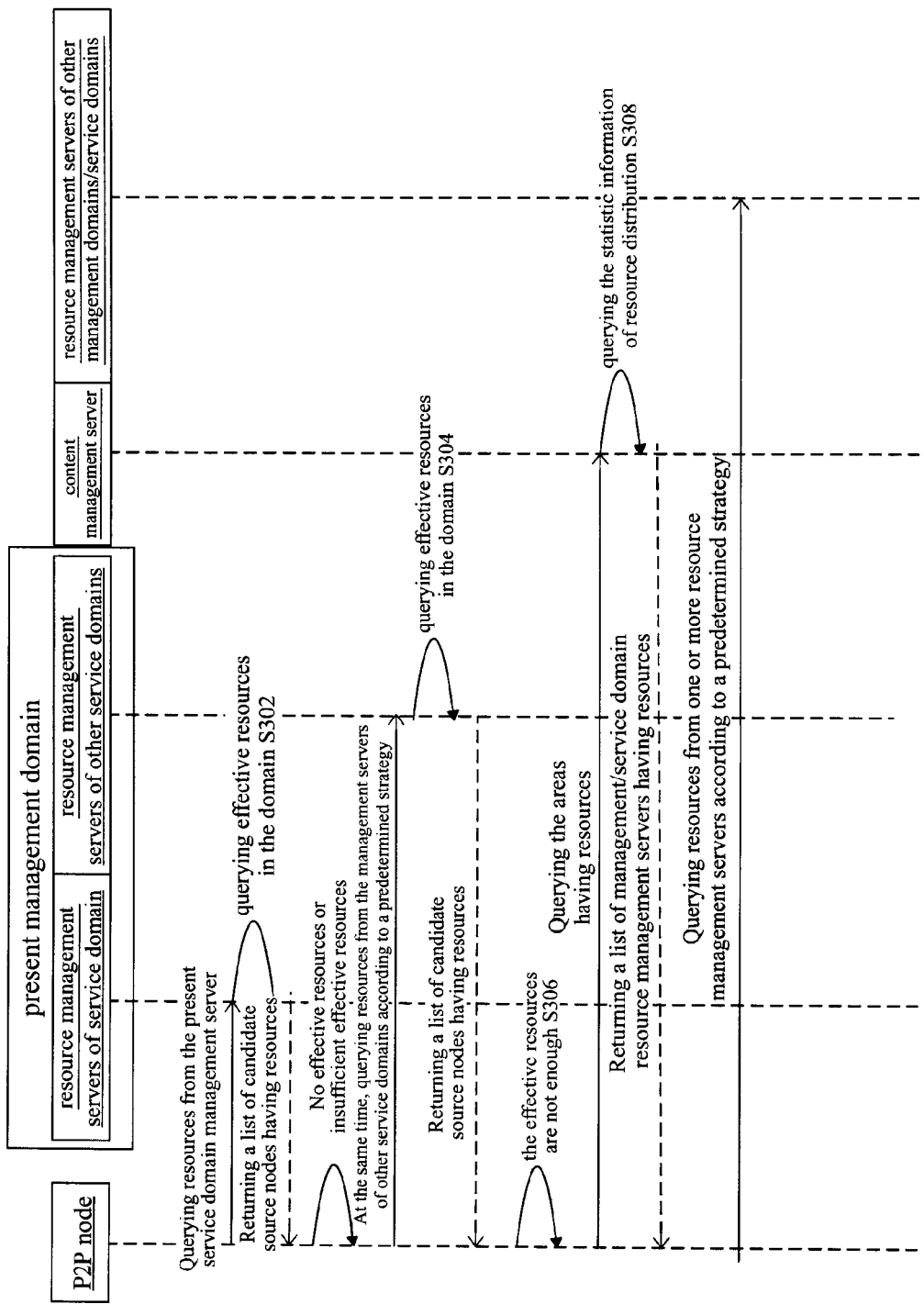

The drawings herein are used to provide further understanding of the present invention and constitute a part of the present application. Exemplary embodiments of the present invention and the description thereof are used to describe the present invention and shall not be construed as improper limitations on the same. In the accompanying drawings:

FIG. 1 schematically illustrates the relationship between the content management server and the resource management server of the P2P system according to the embodiment of the present invention;

FIG. 2 schematically illustrates the relationship between the management domain and the service domains of the P2P system according to the embodiment of the present invention; and FIG. 3 illustrates the flow of the resource query method according to the embodiment of the present invention.

DETAILED DESCRIPTION OF THE INVENTION

The embodiment of the present invention will be detailed hereinafter taken in conjunction with the figures thereof.

Referring to FIG. 1, the P2P system according to the embodiment of the present invention is described. As shown in FIG. 1, in the P2P system according to the embodiment of the present invention, there exist following two types of servers (wherein, the two types of management servers are in layered structure):

A content management server: it does not directly manage the P2P nodes and only concerns the distribution of the content resources managed by itself in various domains. Respective resource management servers will report the statistic information of resources in the domain to the content management periodically. When there are multiple content resource management/copyright parties in the P2P system, there will be multiple P2P content management servers which are independent of each other.

A resource management server: it directly manages the P2P nodes, and periodically reports the statistic information of relevant content resources in its domain to the P2P content management server. When there are the resources of multiple content resource management/copyright parties in its domain, the resource management server will report the statistic information of the resources to relevant multiple P2P content management severs. That is, one resource management server can serve multiple content management servers which are however independent of each other.

Meanwhile, as shown in FIG. 2, the resource management server in the P2P system has two domains: a management domain and a service domain, wherein the management domain belongs to a logic concept and multiple resource management servers can be deployed in one management domain at the same time. The service domain is an area actually governed by the resource management server, and one service domain can be only deployed with one resource management server which is in charge of the resource management of all P2P nodes in the domain, accepts the resource query request from the P2P nodes inside and outside the present domains, and conducts corresponding resource scheduling. That is, a certain P2P node can only belong to one service domain at a particular time, and can only register the resource and status information of itself at the resource management server corresponding to the service domain; but the P2P node can query and acquire resources from other service domains in the management domain served by the service domain that the P2P node belongs to and other management domains. The resource management servers of multiple service domains under one management domain are independent of each other, and so are the resource management servers of different management domains, and they do not have any information interaction therebetween. When the P2P node cannot obtain enough effective resources from the present service domain, it will query and obtain resources from other service domains in accordance with a predetermined strategy (for example, simultaneously or sequentially). If the P2P node cannot obtain enough effective resource from the present management domain, it will query relevant content management server for the distribution area of the resources, acquire the address of the resource management server having resources from the content management servers, and initiate a resource query request to it.

Meanwhile, the P2P node acquires in advance the address of other resource management servers in the management domain and the address of the content management server in a certain manner, that is, all queries are initiated by the P2P node, and a P2P management server (including the content management server and the resource management server) does not need to record the query status of the P2P node, and does not need to forward/redirect or deputize the resource query request of the P2P node, wherein multiple resource management servers of the same management domain have some identical features, for example, they have the same management domain identifier in the server identifier.

During the registration of the P2P node, it is acquired the information of the resource management server corresponding to the service domain allocated by the P2P system according to the location during the registration of the node; and during initializing the information of logging, it is acquired the information of all the resource management servers of the management domain.

After the P2P node has chosen certain content and started relevant applications (for example, ordering program, live broadcast, or downloading), it can be acquired the address of the content management server corresponding to the current content through the P2P system.

Multiple resource management servers in the management domain can be provide based on a predetermined strategy, for example, according to the actual position of the P2P node. If the P2P system can determine according to the IP address of the node the service domain where the node is, the resource management server corresponding to the service domain which the node belongs to is placed on the first position in the management domain server list, otherwise randomly selecting one server which is placed on the first position.

After successfully logging in the P2P node, the P2P node registers its resource and status information at the resource management server placed on the first position in the server list, which serves as a service domain server of the nodes in this P2P session. The P2P node will also perform resource query according to a predetermined strategy, for example, it firstly queries resources from the service domain resource management server, and if the there is no effective resource in the service domain or the effective resource is not enough, the node then queries from other resource management servers in the present management domain.

To clearly describe the resource query path of the P2P node, FIG. 3 illustrates an embodiment of the resource query flow of the P2P node, wherein the P2P node had acquired the address of the resource management servers in multiple service domains in the present management domain during logging in before the resource query and it is supposed the P2P system had determined its current service domain according to the IP address of the node, that is, what is placed in the first position in the management domain server list is the service domain management server of this node. In addition, the P2P node had acquired in a certain manner the address of the content management server corresponding to the content. As shown in FIG. 3, the resource query flow specifically includes the following steps:

S302, the P2P node initiates a resource query request to the resource management server in the present service domain, and the resource management server in the present service domain queries the resources information in its domain and returns according to a predetermined strategy a list of candidate source nodes having resources;

S304, in the case that the P2P node finds that there is no the effective resource or the effective resource is not enough, the P2P node initiates a resource query request to other resource management servers in one or more management domains, and the resource management servers receiving the resource query request query the resource information in the domain and return a list of candidate source nodes having resources, wherein the P2P node and the resource management server can perform the above action according to a same predetermined strategy or according to different predetermined strategies (for example, simultaneously or sequentially).

S306, if the P2P node still can not find enough effective resources, it queries the area having resources from the content management server served by the resource management server that the P2P node belongs to.

S308, the content management server queries the statistic information of the resource distribution and returns a list of resource management servers having resources.

S310, the P2P node initiates a resource query request to one or more resource management servers.

The embodiment shown in FIG. 3 belongs to a resource query flow in an extreme situation, which may bring about serious system delay, but the P2P system may reduce the times of resource queries by a method such as suitable pre-deployment of resources and self-adaptive adjustment of resources, which also fall within the scope of the present invention.

Meanwhile, during the implementation, the P2P node, the resource management server, and the content management server may perform the above actions according to a same predetermined strategy or according to different predetermined strategies, wherein such predetermined strategies can be defined by system administrators or equipment producers.

The present invention can adopt the subdivision of the P2P service area to solve the problem of insufficient processing ability of the server of each server node, and can also overcome the disadvantages of limited nodes and insufficient effective resources in "small service area" via the cooperation between the multiple service domains in the management domain; and also the servers can be implemented easily, independent of each other.

The present invention can also satisfactorily ensure the expandability of the system. It is supposed that a P2P system is just under construction with user scale being small, and then herein the management domain and the service domain can be combined into one. However, with the growing user scale, one management domain can be divided into multiple service domains each of which is deployed with one P2P resource management server. The P2P system can conveniently and flexibly adopt, as required, different cutover strategies, for example, the original P2P resource management server serves as the service domain server for the old user, and can also re-divide the service domain of the user according to the consideration of operation, for example, according to the geographic location of the user. The cutover strategies need only to be presented during the registering and logging of the node and will not affect the operation of the P2P system at all.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all covered in the scope of protection of the present invention.

What is claimed is:

1. A peer-to-peer (P2P) resource query method including the following steps:
    a P2P node, used as both a server and client and providing services to other P2P nodes, initiates a resource query request to resource management servers of the service domain that the P2P node belongs to;
    if the P2P node judges, according to the information returned by the resource management servers of the service domain that the P2P node belongs to, that there is no effective resource or the effective resource is not enough in the service domain that the P2P node belongs to, the P2P node initiates a resource query request to the resource management servers of other service domains according to a predetermined strategy;
    if the P2P node judges, according to the information returned by the resource management servers of said other service domains, that there is no effective resource or the effective resource is not enough in said other servers, the P2P node initiates a resource query request to one or more content management servers served by the resource management servers of the service domain that the P2P node belongs to;
    in response to the request of the P2P node, said one or more content management servers return a list of the resource management server computers having effective resource based off the statistical information of the resource distribution, and
    the P2P node initiates a resource query request to one or more resource management servers in the list of resource management servers;
    wherein the management domain encompasses multiple service domains
    wherein each service domain has at least one corresponding resource management servers and multiple P2P nodes and each service domain is limited by the effective resources available on the resource management servers;
    wherein the multiple resource management servers corresponding to the multiple service domains in the same management domain have identical management domain identifier;
    and
    wherein each content management server does not directly manage P2P nodes and is served by at least one resource management server.

2. The resource query method according to claim 1, wherein the information returned by the resource management servers of the service domain that the P2P node belongs to is a list of candidate source nodes having effective resource in the service domain that the P2P node belongs to.

3. The resource query method according to claim 2, wherein the information returned by the resource management servers of said other service domains is a list of candidate source nodes having effective resource in said other service domains.

4. The resource query method according to claim 3, wherein in the P2P node sequentially or simultaneously initiates the resource query request to the resource management servers of said other service domains.

5. A peer-to-peer (P2P) resource query method including the following steps:
- the P2P node, used as both a server and client and providing services to other P2P nodes, initiates a resource query request to resource management servers of the service domain that the P2P node belongs to;
- after judging that there is no effective resource or the effective resource is not enough in the service domain that the P2P node belongs to, the P2P node initiates a resource query request to resource management servers of other service domains according to a predetermined strategy, otherwise the resource query is ended;
- after judging that there is no effective resource or the effective resource is not enough in said other service domains, the P2P node initiates a resource query request to one or more content management server served by the resource management servers of the service domain that the P2P node belongs to, otherwise the resource query is ended;
- in response to the request of the P2P node, said one or more content management servers return a list of the resource management servers having effective resource based off the statistical information of the resource distribution, and
- the P2P node initiates a resource query request to one or more resource management servers in the list of resource management servers;

wherein the management domain encompasses multiple service domains wherein each service domain has at least one corresponding resource management server and multiple P2P nodes and each service domain is limited by the effective resources available on the resource management servers;

wherein the multiple resource management server computers corresponding to the multiple service domains in the same management domain have identical management domain identifier;

and wherein each content management server does not directly manage P2P nodes and is served by at least one resource management server.

6. The resource query method according to claim 5, wherein the information returned by the resource management servers of the service domain that the P2P node belongs to is a list of candidate source nodes having effective resource in the service domain that the P2P node belongs to.

7. The resource query method according to claim 6, wherein the information returned by the resource management servers of said other service domains is a list of candidate source nodes having effective resource in said other service domains.

8. The resource query method according to claim 7, wherein in the P2P node sequentially or simultaneously initiates the resource query request to the resource management servers of said other service domains.

* * * * *